Patented Jan. 8, 1952

2,581,565

UNITED STATES PATENT OFFICE 2,581,565

CELLULOSE ESTERS

Blanche B. White, Summit, and Elisabeth Barabash, New Providence, N. J., assignors to Celanese Corporation of America, New York, N. Y., a corporation of Delaware No Drawing. Application September 9, 1949, Serial No. 114,916

11 Claims. (Cl. 260—225)

This invention relates to the preparation of cellulose esters and relates more particularly to the preparation of mixed lower aliphatic and acylvanillic acid esters of cellulose.

An important object of this invention is to prepare a vanillic acid ester of cellulose.

A further object of this invention is to prepare the mixed esters of cellulose containing lower aliphatic and acylvanillic acid radicals.

Other objects of this invention will be apparent from the following detailed description and claims.

One of the well recognized byproducts that may be obtained from the sulfite waste liquors of the wood-pulping industry is vanillin, which may be easily converted by alkaline fusion into vanillic acid. However, despite the low cost and ready availability of the raw materials for preparing large quantities of vanillic acid, relatively little commercial use has been made of this material or its derivatives.

We have now discovered that cellulose may be esterified with a lower aliphatic and an acylvanillic acid having the formula

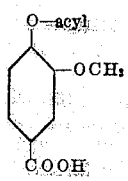

and that the products obtained may be converted into films of good clarity, flexibility, strength and resistance to blushing under conditions of high humidity. In addition, these products may be employed for the preparation of filamentary materials such as filaments, yarns, ribbons, straws and the like, and for the preparation of molding powders. Plasticizers, dyes, pigments and other similar materials may be incorporated into the cellulose ester to modify its properties and those of the products produced therefrom.

The lower aliphatic acids from which the cellulose esters of our invention may be prepared include, for example, acetic acid, propionic acid, butyric acid and mixtures thereof, and examples of acylvanillic acids are acetylvanillic acid, propionylvanillic acid, butyrylvanillic acid and mixtures thereof.

In carrying out our invention, cellulosic material, preferably after a suitable pretreatment to increase its reactivity, is contacted with the anhydride of the acids whose esters are to be formed in the presence of an esterification catalyst, such as sulfuric acid, and an inert liquid diluent or a solvent for the ester being formed. After all the cellulosic material has been esterified, water is added to the esterification mixture in an amount sufficient to convert any remaining anhydride to the corresponding acid, and the cellulose ester, preferably after the addition of a further quantity of water to the esterification mixture, is permitted to ripen or hydrolyze to impart the desired solubility characteristics thereto. The cellulose ester is then separated from the esterification mixture, washed to remove acid and other impurities therefrom, extracted with an organic solvent, such as ether, to remove therefrom any vanillic acid, stabilized if necessary, washed again and finally dried.

The cellulose ester of our invention may also be prepared by the esterification, with an acylvanillic acid, of a lower aliphatic acid ester of cellulose that has been ripened or hydrolyzed, or partially saponified so that it contains free hydroxyl groups. The esterification may effectively be carried out by treating the lower aliphatic acid ester of cellulose with an acylvanillic acid in the presence of an "esterification impeller" such as chloracetic anhydride or other halogen- or alkoxy-substituted aliphatic acid anhydride, an esterification catalyst such as magnesium perchlorate, and a solvent for the ester being formed, e. g., nitromethane. The esterification impeller causes the reaction, with the acylvanillic acid, of the free hydroxyl groups of the lower aliphatic acid ester of cellulose without the impeller itself reacting with said hydroxyl groups. After the esterification is complete, the cellulose ester formed may, if necessary, be ripened or hydrolyzed in the presence of water to impart the desired solubility characteristics thereto, separated from the esterification mixture, washed to remove acid and other impurities therefrom, extracted with an organic solvent such as ether to remove therefrom any acylvanillic acid, stabilized, if necessary, washed again and finally dried.

The preparation of the cellulose esters of our invention by the esterification, with an acylvanillic acid, of a lower aliphatic acid ester of cellulose containing free hydroxyl groups is particularly advantageous in preparing a cellulose ester containing a small number, say from 0.1 to 1.0 acylvanilloyl acid groups per glucose residue of the cellulose molecule, since it permits of ready control in introducing these groups.

The cellulose esters prepared in accordance with this invention may be dissolved in a suitable solvent, such as acetone, acetone and ethyl alcohol, dioxane and the like to produce dope, which may be cast or spun to produce films or filamentary material in a manner well known in the art.

The following examples are given to illustrate our invention further.

*Example I*

Into a solution of 2 parts by weight of fused zinc chloride in 85 parts by weight of acetic anhydride, there is entered 16.8 parts by weight of vanillic acid. The mixture so formed is held at room temperature (25° C.) for 0.5 hour and is then heated for 1 hour on a steam bath. The reaction mixture, a clear, dark brown liquid, is poured into a large mass of crushed ice and permitted to stand for 16 hours. The precipitated acetylvanillic acid is filtered off, suspended in cold water, treated with 8.5 parts by weight of dry sodium bicarbonate and filtered again. The clear, yellowish filtrate is acidified with dilute hydrochloric acid, precipitating free acetylvanillic acid in the form of light, white crystals. There are obtained 13.6 parts by weight, or 66.5% of theoretical, of acetylvanillic acid having a melting point of 140° C. and a methoxy content of 15.0%.

*Example II*

Into a solution containing 10 parts by weight of a cellulose acetate having 2.35 acetyl and 0.65 hydroxyl groups per glucose residue dissolved in 77 parts by weight of nitromethane, there is entered a solution containing 16 parts by weight of the acetylvanillic acid produced in accordance with the process of Example I dissolved in 65 parts by weight of nitromethane. To the solution so formed there is added a solution containing 13 parts by weight of chloracetic anhydride in 22 parts by weight of nitromethane, and a solution containing 0.04 part by weight of magnesium perchlorate also dissolved in 22 parts by weight of nitromethane. The mixture is refluxed with stirring at 50–60° C. for 8 hours. The cellulose ester is then precipitated by the addition of 500 parts by weight of water to the solution, filtered, washed, ether extracted to remove therefrom any acetylvanillic acid, washed again and finally dried. There is obtained a cellulose ester containing 2.35 acetyl, 0.1 acetylvanilloyl and 0.55 hydroxyl groups per glucose residue.

*Example III*

Dope is formed by dissolving 20 parts by weight of the cellulose ester produced in accordance with the process of Example II in 80 parts by weight of acetone. The dope is spread on a casting surface and the acetone evaporated therefrom. There is produced a clear film that is strong and pliable and does not blush upon immersion in water.

It is to be understood that the foregoing detailed description is given merely by way of illustration and that many variations may be made therein without departing from the spirit of our invention.

Having described our invention, what we desire to secure by Letters Patent is:

1. A mixed lower aliphatic and acylvanillic acid ester of cellulose, wherein the acyl radical of the acylvanillic acid is that of a lower aliphatic acid.

2. A mixer acetic and acetylvanillic acid ester of cellulose.

3. A mixed lower aliphatic and acylvanillic acid ester of cellulose, wherein the acyl radical of the acylvanillic acid is that of a lower aliphatic acid, said ester containing from 0.1 to 1.0 acylvanilloyl groups per glucose residue.

4. A mixed acetic and acetylvanillic acid ester of cellulose, said ester containing from 0.1 to 1.0 acetylvanilloyl groups per glucose residue.

5. The process for preparing cellulose esters, which comprises reacting a lower aliphatic acid ester of cellulose containing free hydroxyl groups with an acylvanillic acid, wherein the acyl radical is that of a lower aliphatic acid.

6. The process for preparing cellulose esters, which comprises reacting a lower aliphatic acid ester of cellulose containing free hydroxyl groups with an acylvanillic acid, wherein the acyl radical is that of a lower aliphatic acid, in the presence of an esterification impeller.

7. The process for preparing cellulose esters, which comprises reacting a lower aliphatic acid ester of cellulose containing free hydroxyl groups with an acylvanillic acid, wherein the acyl radical is that of a lower aliphatic acid, in the presence of an esterification impeller selected from the group consisting of halogen and alkoxy substituted aliphatic acid anhydrides.

8. The process for preparing cellulose esters, which comprises reacting a lower aliphatic acid ester of cellulose containing free hydroxyl groups with an acylvanillic acid, wherein the acyl radical is that of a lower aliphatic acid, in the presence of an esterification impeller selected from the group consisting of halogen and alkoxy substituted aliphatic acid anhydrides, an esterification catalyst, and a solvent for the ester being formed.

9. The process for preparing cellulose esters, which comprises reacting a cellulose acetate having free hydroxyl groups with acetylvanillic acid.

10. The process for preparing cellulose esters, which comprises reacting a cellulose acetate having free hydroxyl groups with acetylvanillic acid in the presence of chloracetic anhydride.

11. The process for preparing cellulose esters, which comprises reacting a cellulose acetate having free hydroxyl groups with acetylvanillic acid in the presence of chloracetic anhydride, magnesium perchlorate, and as a solvent for the cellulose esters, nitromethane.

BLANCHE B. WHITE.
ELISABETH BARABASH.

REFERENCES CITED

The following references are of record in the file of this patent:

UNITED STATES PATENTS

| Number | Name | Date |
|---|---|---|
| 1,785,466 | Webber et al. | Dec. 16, 1930 |
| 2,285,536 | Seymour et al. | June 9, 1942 |